Patented Jan. 1, 1935

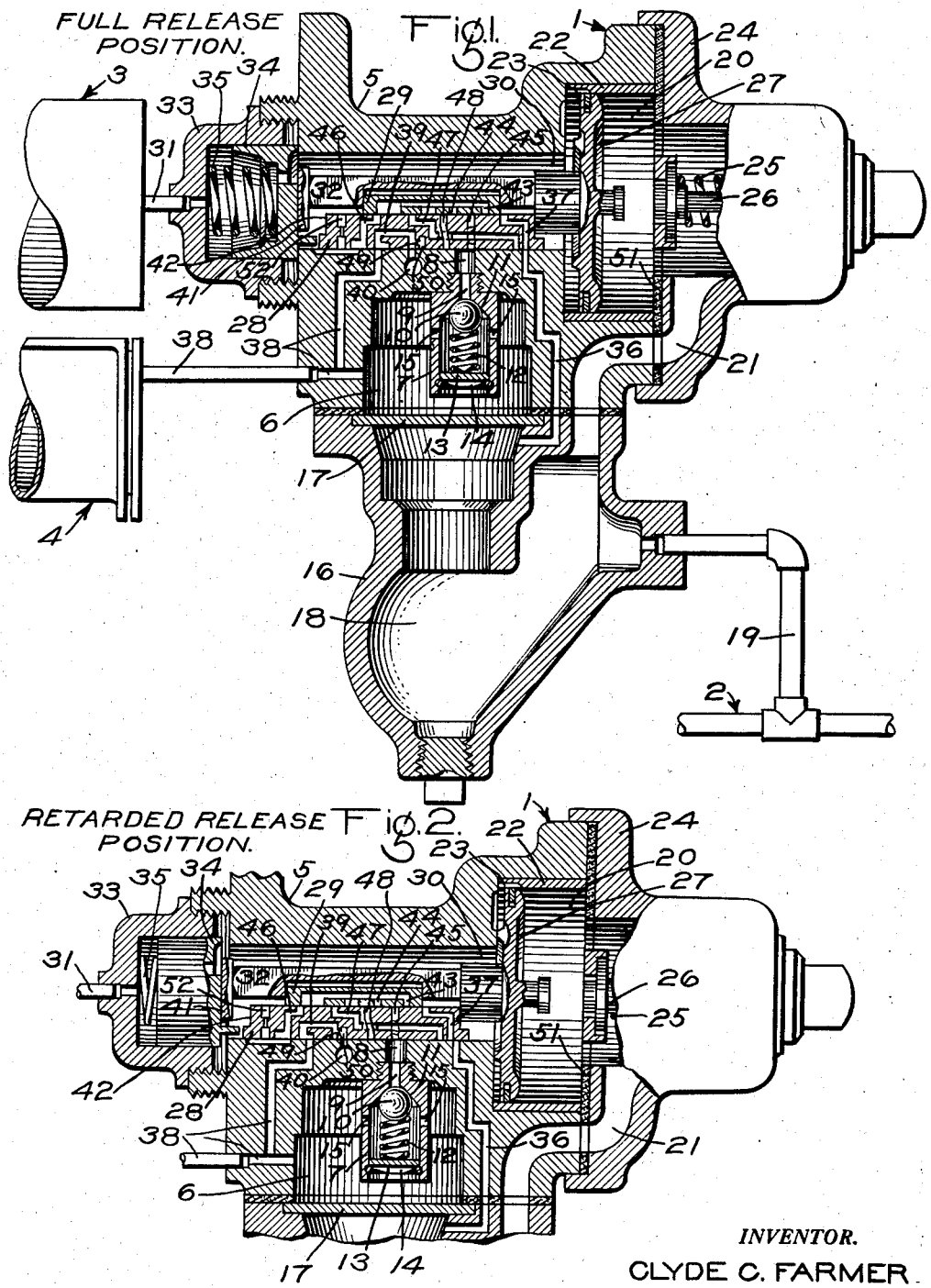

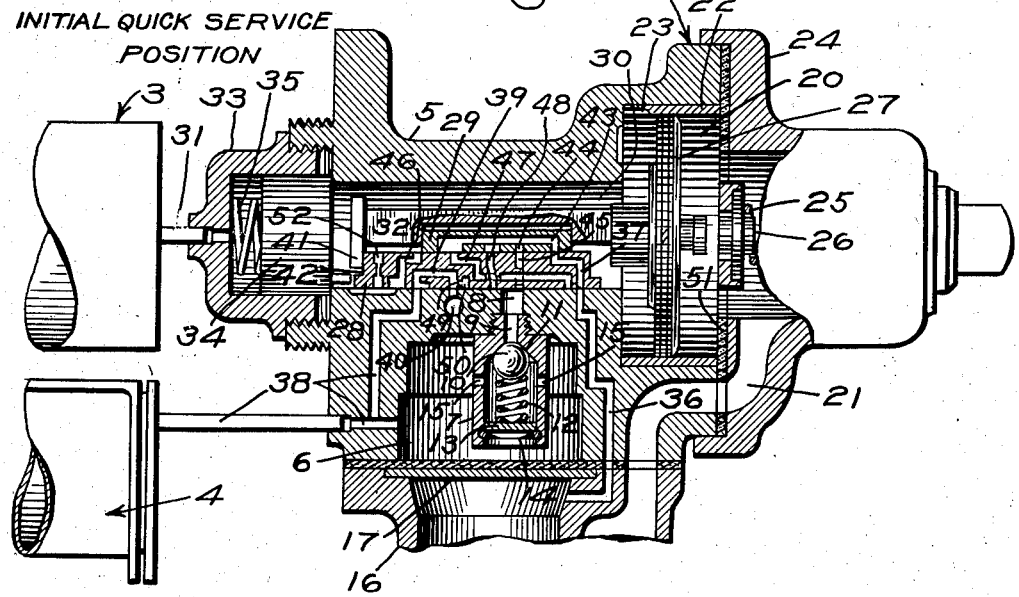

1,986,470

UNITED STATES PATENT OFFICE 1,986,470

FLUID PRESSURE BRAKE

Clyde C. Farmer, Pittsburgh, Pa., assignor to The Westinghouse Air Brake Company, Wilmerding, Pa., a corporation of Pennsylvania Application June 17, 1932, Serial No. 617,791
Renewed April 6, 1934

9 Claims. (Cl. 303—38)

This invention relates to fluid pressure brake equipment which operates according to variations in brake pipe pressure to control the application and release of the brakes.

For the purpose of economy, there is continuing tendency to increase the number of cars in a train and where heretofore a freight train might consist of one hundred cars, it is now desired to operate trains of more than one hundred cars.

The equipment at present employed was originally designed to operate in trains up to one hundred cars in length, but with the continuing increase in train length, various operating difficulties are being encountered, especially in obtaining the desired operation of the equipment on the cars at the rear end of a long train, and the principal object of my invention is to so modify the ordinary triple valve device of the brake equipment that it will cooperate with the other parts of the equipment to provide the desired control of the brakes on a very long train.

According to the above object the ordinary triple valve device is adapted to be utilized, in the usual brake equipment, without excessive or costly alterations, to provide the desired control of the brakes on a very long train, which could not be accomplished with the triple valve device as originally constructed.

It will be apparent that, when it is desired to alter the present brake equipment, so that it will function to control the brakes on a longer train than it was originally designed to control, all that is necessary is to modify the old triple valve device and since this may be done without excessive cost it will be unnecessary to discard or scrap the old triple valve device.

Other objects and advantages will appear in the following more detailed description of the invention.

In the accompanying drawings; Fig. 1 is a diagrammatic view, mainly in section, of a fluid pressure brake equipment embodying my modified triple valve device which is shown in full release position; and Figs. 2, 3 and 4 are similar views showing the triple valve parts in retarded release position, initial quick service position and full service position, respectively.

As shown in the accompanying drawings, my improved equipment may comprise a triple valve device 1, a brake pipe 2, an auxiliary reservoir 3 and a brake cylinder 4.

The triple valve device 1 in the present embodiment of my invention is of the well known "K" type which has been modified for use in my improved equipment. In modifying an old triple valve device, the quick action mechanism is removed from the triple valve casing 5 leaving the chamber 6, which contained the quick action mechanism, open at one end. Contained in the chamber 6 is a check valve device comprising a hollow cage 7 which, at one end, has screw-threaded connection with the casing 5 within a passage 8, through which fluid under pressure was formerly adapted to be supplied to the chamber 6 in effecting either a service or an emergency application of the brakes, this end of the check valve casing having a passage 9 open to the passage 8. A check valve preferably in the form of a ball 10 is contained in the cage 7, said check valve being constantly urged toward its seat 11 by the action of a spring 12, which is seated on a spring seat 13 held in the cage by a snap ring 14 which is snapped in a groove formed in the wall of the cage. The interior of the check valve cage is open to the chamber 6 through openings 15 provided in the wall of the cage. The check valve 10 is provided for the purpose of preventing back flow of fluid from the chamber 6 to the passage 9 as will appear in the following description.

After the check valve device is thus secured to the triple valve casing 5, the old check valve casing 16, from which the check valve mechanism has been removed, is again secured to the triple valve casing in its original position, there being a new element in the form of a plate 17 clamped between the triple valve casing and the check valve casing. The plate 17 fits in the recess in the check valve casing, which formerly accommodated the combined guide and valve seat member of the quick action mechanism, and closes off the chamber 6 from a chamber 18 in the check valve casing, which latter chamber is connected to the brake pipe 2 by way of a pipe 19 and to the triple valve piston chamber 20 by way of a passage 21.

The old triple valve piston bushing is removed from the casing 5 and a new bushing 22 substituted having a feed groove 23 formed therein which is of less length than the feed groove in the old bushing.

The old piston chamber cap 24 carrying the graduating spring 25 and stop 26 is used without change and is secured, in its original position, to the casing 5 in the usual manner.

The old triple valve piston 27 is used without change and a new main slide valve 28 and a new graduating slide valve 29 are substituted for the old slide valves and are contained in the valve chamber 30 which is open through a pipe 31 to the auxiliary reservoir 3. These valves are adapted to be operated through the medium of the piston stem 32, which has been slightly modified by lengthening the graduating valve receiving notch to accommodate the new graduating valve which is longer than the old valve.

Contained in the old cage member 33, which has screw-threaded connection with the casing 5, is a retarded release stop 34 which is subject to the pressure of a spring 35, said stop and spring being salvaged from the old triple valve device and used without change.

In operation, to initially charge the equipment, fluid under pressure is supplied to the brake pipe 2 in the usual manner and flows therefrom through pipe 19 to the chamber 18 in the cap 16 and from the chamber 18 flows through passage 21 to the triple valve piston chamber 20. With the triple valve device in full release position as shown in Fig. 1 of the drawings, fluid under pressure supplied to the chamber 18 also flows through the old quick service passage 36 and a port 37 in the main slide valve 28 to the valve chamber 30 and from thence flows through pipe 31 to the auxiliary reservoir 3.

Further, with the triple valve device in full release position, the brake cylinder 4 is open to the atmosphere by way of pipe and passage 38, a cavity 39 in the main slide valve 28 and a passage 40. The chamber 6 is also open to the atmosphere through passage 38.

If it is desired to effect a service application of the brakes, fluid under pressure is gradually vented from the brake pipe 2 and the connected triple valve piston chamber 20 through the medium of the usual brake valve device (not shown). When the pressure of fluid in the piston chamber 20 is thus reduced slightly below the pressure of fluid in valve chamber 30, the piston 27 moves outwardly toward service position, shifting the graduating slide valve 29 in the same direction relative to the main slide valve 28. As the graduating slide valve is thus shifted, it first laps the port 37 in the main slide valve 28 and thus prevents the back flow of fluid from the valve chamber 30 and auxiliary reservoir 3 to the brake pipe and also uncovers the service port 46 in the main slide valve. After the port 37 is thus lapped, the piston continues to shift the graduating slide valve relative to the main valve until such time as the collar 41 on the rear end of the piston stem 32 engages the rear end surface 42 of the main slide valve 28, at which time further movement of the piston will cause both valves to be moved in unison toward application position.

When the collar 41 engages the main slide valve, the graduating slide valve will have been shifted to initial quick service position, as shown in Fig. 3 of the drawings. In this position a passage 43 in the auxiliary slide valve registers with the port 37 in the main slide valve and a port 44, leading from the passage 43, registers with a port 45 in the main slide valve, which latter port is open to the passage 8 in the triple valve casing 5. Fluid under pressure is now locally vented from the brake pipe to the atmosphere by way of pipe 19, chamber 18, passage 36, port 37 in the main slide valve, passage 43 in the graduating valve, port 44, port 45 in the main slide valve, passage 8, passage 9 in the check valve cage 7, past the ball check valve 10, openings 15 in the cage 7, chamber 6, passage 38, cavity 39 in the main slide valve and passage 40, causing a local reduction in brake pipe pressure which acts to hasten the movement of the triple valve parts on the next car in a train to initial quick service position. The triple valve device on said next car then functions in a similar manner and, in this way, a quick response to the brake pipe reduction is transmitted serially throughout the length of the train.

This initial local reduction in brake pipe pressure also acts to hasten the movement of the local triple valve parts to brake application position, and further, insures the movement of the local triple valve parts toward application position.

When the piston 27 and graduating slide valve 29 move to the initial quick service position as shown in Fig. 3, the collar 41 on the piston stem 32 is brought into engagement with the rear end of the main slide valve 28, so that upon further movement of the piston toward service position, the main slide valve will be shifted in the same direction.

The main slide valve, as it is thus moved, cuts off the communication from the brake pipe passage 36 to the passage 43 and also cuts off communication from the brake cylinder passage 38 to the atmospheric passage 40. A further forward movement of the main slide valve now causes the service port 46 and quick service ports 47 and 48 in the main slide valve, which have been previously connected to the passage 43 in the auxiliary slide valve upon the initial movement of the auxiliary slide valve relative to the main valve, to be opened to the respective brake cylinder passage 38, brake pipe passage 36 and quick service passage 8 in the triple valve casing, so that fluid under pressure is then admitted from the auxiliary reservoir 3 to the brake cylinder 4 by way of passage and pipe 38, and fluid under pressure is also vented from the brake pipe to the brake cylinder by way of passage 36, port 47 in the main slide valve, passage 43 in the auxiliary slide valve, port 48 in the main slide valve, passages 8 and 9 past the ball check valve 10, passages 15 in the check valve cage, chamber 6 and passage and pipe 38.

When the triple valve parts are shifted to final quick service position, as just described, the piston 27 engages the stop 26, after which the further forward movement of the piston and slide valves toward full service position is yieldably resisted by the graduating spring 25. The triple valve parts upon reaching full service position, as shown in Fig. 4, will come to a stop due to the quick service communication from the brake pipe being cut off and the increase in the rate of flow of fluid from the auxiliary reservoir to the brake cylinder. In the event of the triple valve parts moving outwardly beyond full service position, the capacity of the service port is rapidly increased and the rate of decrease in auxiliary reservoir pressure is correspondingly increased. By this means the triple valve parts are prevented from unintentionally moving to emergency application position during a service application of the brakes.

It will here be understood that, in the present embodiment of my invention, the final quick service venting of fluid from the brake pipe to the brake cylinder and the movement of the triple valve parts from quick service position to full service position are accomplished in substantially the same manner as in the standard K type of triple valve device described in detail in W. V. Turner Patent No. 1,108,948, issued September 1, 1914. For this reason a more detailed description, dealing with the relative sizes and shape of the service and quick service ports and passages, is deemed unnecessary.

After the auxiliary reservoir pressure has been reduced by flow to the brake cylinder in a service application of the brakes to substantially equal the pressure in the brake pipe, the piston 27 shifts the graduating valve rearward relative to the main slide valve to lap position in which the flow of fluid from the auxiliary reservoir to the brake cylinder is closed off. If the main slide valve should be in quick service position when the piston moves to lap position, the auxiliary slide valve will lap the quick service ports 47 and 48 in the main slide valve so that no further quick service flow of fluid from the brake pipe will occur. If the triple valve parts should be in full service position when the piston moves to lap position, the quick service ports 47 and 48 will be lapped by the graduating valve, but this is of no consequence since the main slide valve in full service position closes communication from the brake pipe to the brake cylinder.

To effect the release of the brakes, the brake pipe pressure is increased in the usual manner. At the head end of a train, where this increase in brake pipe pressure will be at a fast rate, the triple valve parts will be shifted to retarded release position, as shown in Fig. 2, compressing the spring 35 and at the rear of the train, where the increase in brake pipe pressure is slower, the triple valve parts will be shifted to full release position as shown in Fig. 1, the action of the spring 35 preventing the further rearward movement of the piston.

With the triple valve parts in retarded release position, fluid under pressure is released from the brake cylinder to the atmosphere at a retarded rate by way of pipe and passage 38, cavity 39 in the main slide valve, a restricting passage 49, a cavity 50 and passage 40. With the piston 27 in retarded release position, fluid under pressure supplied from the brake pipe to the piston chamber 20 flows through the feed groove 23 to the valve chamber 30 and from thence flows through pipe 31 to the auxiliary reservoir. It will here be noted that with the main slide valve in retarded release position the brake pipe passage 36 is lapped, so that fluid under pressure in this passage cannot flow to the valve chamber 30 and connected auxiliary reservoir 3.

With the triple valve parts in full release position, fluid under pressure is released at a more rapid rate from the brake cylinder by way of pipe and passage 38, cavity 39 in the main slide valve and passage 40, so that although the brakes on the cars at the head end of the train may start to release before those on the cars at the rear end of the train, the release of fluid under pressure from the brake cylinders on the cars at the head end of the train is sufficiently slow to insure a more nearly synchronous release of the brakes than would otherwise be the case. With the main slide valve 28 in full release position, fluid under pressure from the brake pipe passage 36 flows through port 37 in the main slide valve to the valve chamber 30 and from thence flows through pipe 31 to the auxiliary reservoir 3.

With the triple valve parts in full release position, the port 37 in the main slide valve 28 is open to the valve chamber 30, so that fluid at brake pipe pressure flowing through the port cannot act to raise the graduating valve from its seat.

It will be understood that the feed grooves 23 will restrict the flow of fluid to the auxiliary reservoirs on the cars at the head end of the train, so that more fluid under pressure will flow through the brake pipe to the rear of the train and consequently the recharge of the auxiliary reservoirs on the cars at the rear end of the train is hastened.

When the pressures of fluid on opposite sides of the pistons 27 on the cars at the head end of the train become substantially equal, the spring 35 acts to return the piston and slide valve to full release position in the usual well known manner.

If it is desired to effect an emergency application of the brakes, a sudden reduction in brake pipe pressure is effected, which permits auxiliary reservoir pressure in piston chamber 30 to promptly move the piston 27 and slide valves 28 and 29 from full release position to emergency position, in which latter position the piston engages a gasket 51. In this position fluid under pressure is supplied from the auxiliary reservoir 3 and valve chamber 30 through an emergency port 52 in the main slide valve and passage and pipe 38 to the brake cylinder 4.

Upon an increase in brake pipe pressure to effect a release of the brakes after an emergency application, the triple valve parts are shifted from emergency position to release position in the same manner as before described in connection with the release of the brakes after a service application.

The purpose of the check valve 10 is to prevent the back flow of fluid from the brake cylinder to the brake pipe when the triple valve device is in application position and the brake pipe pressure is lower than brake cylinder pressure, as would be the case in the event of an over reduction in brake pipe pressure being effected.

From the foregoing description it will be seen that by the use of a triple valve device which has been modified in accordance with my invention, the usual fluid pressure brake equipment which was designed to control the brakes on a train up to one hundred cars will function to provide the desired control of the brakes on a much longer train.

The subject matter relating to the feature of effecting a plurality of local reductions in brake pipe pressure in effecting an application of the brakes is broadly claimed in my pending applications, Serial No. 473,323, filed August 6, 1930, and Serial No. 612,465, filed May 20, 1932, and it will be understood that the claims in the present application which relate to this feature are intended to cover combinations not disclosed in either of my above mentioned pending applications.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, and means included in said triple valve device operated upon a reduction in brake pipe pressure to establish communication from said passage to the chamber in said casing for locally venting fluid under pressure from the brake pipe to the communication through which fluid under pressure is adapted to be supplied to and released from the brake cylinder.

2. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, means included in said triple valve device operated upon a reduction in brake pipe pressure to establish communication from said passage to the chamber in said casing for locally venting fluid under pressure from the brake pipe to the communication through which fluid under pressure is adapted to be supplied to and released from the brake cylinder, and a check valve device contained in the chamber in said casing and secured to the casing for preventing back flow of fluid from the chamber in the casing to said passage.

3. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, an auxiliary reservoir, and means included in said triple valve device normally establishing communication through which fluid under pressure is supplied from said passage to said reservoir and operated upon a reduction in brake pipe pressure for closing said communication and for establishing a communication through which fluid under pressure is vented from said passage to the chamber in said casing to effect a local reduction in brake pipe pressure.

4. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, an auxiliary reservoir, and means included in said triple valve device normally establishing a communication through which fluid under pressure is supplied from said passage to said reservoir and also establishing a connection from the brake cylinder communication to the atmosphere and operated upon a reduction in brake pipe pressure for first closing the communication from the passage to the auxiliary reservoir and for then establishing a communication from the passage to the chamber in said casing to effect a local reduction in brake pipe pressure.

5. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, an auxiliary reservoir, and means included in said triple valve device normally establishing a communication through which fluid under pressure is supplied from said passage to said reservoir and also establishing a connection from the brake cylinder communication to the atmosphere and operated upon a reduction in brake pipe pressure for first closing the communication from the passage to the auxiliary reservoir, then establishing a communication from said passage to the chamber in said casing to effect an initial local reduction in brake pipe pressure, then closing the communication from the passage to the chamber in the casing and closing the connection from the brake cylinder communication to the atmosphere and then establishing a communication through which fluid under pressure is supplied from the auxiliary reservoir to the brake cylinder to effect an application of the brakes and also establishing a communication from the passage to the chamber in the casing to effect a second local reduction in brake pipe pressure.

6. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, an auxiliary reservoir, and means included in said triple valve device normally establishing a communication through which fluid under pressure is supplied from said passage to said reservoir and also establishing a connection from the brake cylinder communication to the atmosphere and operated upon a reduction in brake pipe pressure for first closing the communication from the passage to the auxiliary reservoir, then establishing a communication from said passage to the chamber in said casing to effect an initial local reduction in brake pipe pressure, then closing the communication from the passage to the chamber in the casing and closing the connection from the brake cylinder communication to the atmosphere and then establishing a communication through which fluid under pressure is supplied from the auxiliary reservoir to the brake cylinder to effect an application of the brakes and also establishing a communication from the passage to the chamber in the casing to effect a second local reduction in brake pipe pressure and finally for closing the communication from said passage to the chamber in said casing.

7. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, said triple valve device also comprising a main valve normally connecting said brake cylinder communication to the atmosphere, a graduating valve having a movement relative to the main valve and a movable abutment for operating said valves, and means operated upon movement of the graduating valve relative to the main valve for connecting said passage to the chamber in the casing to locally vent fluid under pressure from the brake pipe.

8. In a fluid pressure brake equipment, the combination with a brake pipe and a brake cylinder, of a triple valve device comprising a salvaged casing having a chamber from which a quick action mechanism has been removed and which is open at one end and which is also open to a communication through which fluid under pressure is adapted to be supplied to and released from the brake cylinder, said casing also having a brake pipe passage which was formerly a quick service passage, a salvaged cap having a chamber from which a check valve mechanism has been removed and which is open at one end and also open to the brake pipe and to said passage, said cap being secured in its original position to said casing, a member clamped between said cap and casing and closing the open ends of said chambers, said triple valve device also comprising a main valve, a graduating valve having a movement relative to the main valve, and a piston operated upon a reduction in brake pipe pressure for actuating said valves, means operative upon movement of said graduating valve relative to the main valve for establishing communication from said passage to the chamber in the casing.

9. In a fluid pressure brake, the combination with a brake pipe, of a triple valve device comprising a main valve having a port in communication with the brake pipe, a port in communication with a passage to which fluid under pressure is adapted to be vented from the brake pipe and two ports through which fluid under pressure is adapted to be vented from the brake pipe, a graduating valve movable relative to the main valve and a piston operated upon a reduction in brake pipe pressure for actuating said valves, said graduating valve having a cavity for connecting said ports in the main valve when the graduating valve is moved relative to the main valve, the first mentioned ports and said cavity establishing a communication through which fluid under pressure is vented from the brake pipe, said main valve upon movement by said piston first closing said communication and then bringing the second mentioned ports in communication with the brake pipe and passage and also establishing a communication through which fluid under pressure is supplied to effect an application of the brakes, the second mentioned ports and said cavity establishing a communication through which fluid under pressure is vented from the brake pipe, and finally closing the last mentioned communication.

CLYDE C. FARMER.